US012501919B2

(12) United States Patent
Espin et al.

(10) Patent No.: US 12,501,919 B2
(45) Date of Patent: Dec. 23, 2025

(54) METHOD FOR INCREASING ANTHOCYANIN CONTENT IN CARROTS

(71) Applicants: UNIVERSITY OF COPENHAGEN, Copenhagen K (DK); Chr. Hansen Natural Colors A/S, Hoersholm (DK)

(72) Inventors: Gregorio Barba Espin, Copenhagen Ø (DK); Henrik Vlk Luetken, Broenshoej (DK); Bjarne Joernsgaard, Koege (DK); Renate Petra Brigitte Mueller, Malmoe (SE); Tsaneta Dzhanfezova, Copenhagen (DK); Stephan Glied, Stuttgart (DK); Bjoern Madsen, Helsingoer (DK); Finn Thyge Okkels, Roskilde (DK)

(73) Assignee: UNIVERSITY OF COPENHAGEN, Copenhagen K (DK)

( * ) Notice: Subject to any disclaimer, the term of this patent is extended or adjusted under 35 U.S.C. 154(b) by 206 days.

(21) Appl. No.: 16/334,009

(22) PCT Filed: Sep. 22, 2017

(86) PCT No.: PCT/EP2017/074096
§ 371 (c)(1),
(2) Date: Mar. 16, 2019

(87) PCT Pub. No.: WO2018/055108
PCT Pub. Date: Mar. 29, 2018

(65) Prior Publication Data
US 2019/0307152 A1 Oct. 10, 2019

(30) Foreign Application Priority Data
Sep. 23, 2016 (EP) ..................................... 16190288

(51) Int. Cl.
*A23L 5/44* (2016.01)
*A01N 27/00* (2006.01)
(Continued)

(52) U.S. Cl.
CPC ................ *A23L 5/44* (2016.08); *A01N 27/00* (2013.01); *A01N 57/20* (2013.01); *C09B 61/00* (2013.01);
(Continued)

(58) Field of Classification Search
CPC ......... A23L 5/44; C09B 61/00; C09B 67/006; A23C 2002/00
(Continued)

(56) References Cited

U.S. PATENT DOCUMENTS

| 2003/0082281 A1 | 5/2003 | Kohler et al. |
| 2011/0053773 A1* | 3/2011 | Armel ................. A01N 37/34 504/107 |
| 2014/0245471 A1 | 8/2014 | Freeman |

FOREIGN PATENT DOCUMENTS

| EP | 0480297 | * 10/1991 | ............. C09B 61/00 |
| EP | 1 279 703 A1 | 1/2003 | |

OTHER PUBLICATIONS

Saltveit, Effect of Ethylene on quality of fresh fruits and vegetables, Postharvest Biology and Technology 15 (1999), 279-292.*
(Continued)

*Primary Examiner* — Nikki H. Dees
*Assistant Examiner* — Philip A Dubois
(74) *Attorney, Agent, or Firm* — Jerold I Schneider; SCHNEIDER IP LAW

(57) ABSTRACT

A method for obtaining an anthocyanin pigment color composition from carrot plants (preferably black carrot plants) comprising pre-harvest foliar spraying of an ethylene-releasing compound and the use of the obtained anthocyanin
(Continued)

Figure 3:
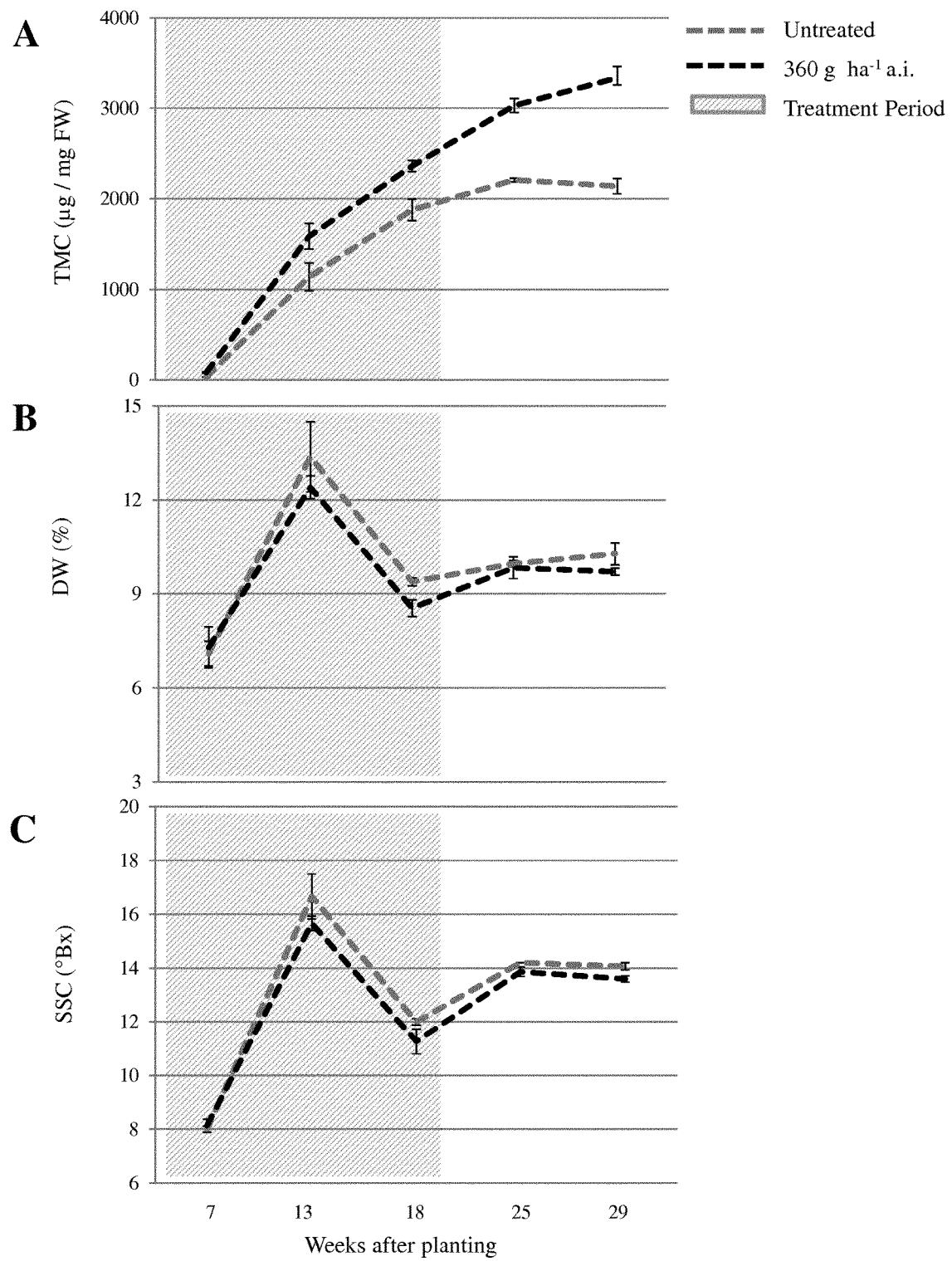

pigment color composition for coloring of an edible product or a pharmaceutical product.

12 Claims, 4 Drawing Sheets

(51) Int. Cl.
*A01N 57/20* (2006.01)
*C09B 61/00* (2006.01)
*C09B 67/20* (2006.01)

(52) U.S. Cl.
CPC ........ *C09B 67/006* (2013.01); *A23V 2002/00* (2013.01)

(58) Field of Classification Search
USPC .......................................................... 426/250
See application file for complete search history.

(56) References Cited

OTHER PUBLICATIONS

Montilla et al., Anthocyanin Composition of Black Carrot (*Daucus carota* ssp. *sativus* var. atrorubens Alef.) Cultivars Antonina, Beta Sweet, Deep Purple, and Purple Haze, |J. Agric. Food Chem. 2011, 59, 3385-3390.*

Lieberman et al. Some Charactersitics of the Sytem Converting 1-Aminocylcopropnae-1-carboxylic Acid to Ethylene, Plant Physiol (1981) 67, 80-84.*

Weiss, et al., Color Enhancement in Cranberry Fruit By Using Environmentally Safe Natural Products, Dept Horticulture WISC, accessed at https://fruit.webhosting.cals.wisc.edu/wp-content/uploads/sites/36/2011/05/Color-Enhancement-in-Cranberry-Fruit-by-Using-Environmentally-Safe-Natural-Products.pdf, 2011.*

Ethephon 2 Plant Regular Label; Feb. 10, 2006' Micro Flo Company accessed at http://fs1.agrian.com/pdfs/Ethephon_2_(Ad_071904_2083569)_Label.pdf.*

Algarra et al. 2014. Anthocyanin Profile and Antioxidant Capacity of Black Carrots (*Daucus carota* L. ssp. *Sativus* var. atrorubens (*Daucus carota* L. ssp. *Sativus* var. atrorubens Alef.) from Cuevas Bajas, Spain.*

Farag et al. 1992. Ethanol Enhances the Effectiveness of Ethephone on Anthocyanin Production in Cranberry Fruits in the Filed, HortScience 27(5): 411-412.*

Bewick et al., "Effect of ethephon on the carotene content of early planted carrots," Acta Horticulturae: Manipulation of Ethylene Responses, Issue: 201, pp. 125-131 (1987).

Gómez-cordovés et al., "Effect of Ethephon and Seniphos Treatments on the Anthocyanin Composition of Starking Apples," J. Agric. Food Chem., vol. 44, No. 11, pp. 3449-3452 (1996).

Levy et al., "Effect of ethylene-releasing compounds on oleocellosis in 'Washington' navel oranges," Scientia Horticulturae, vol. 11, Issue 1, pp. 61-68 (Aug. 1979).

Mcgiffen Jr et al., "Ethephon Increases Carotene Content and Intensifies Root Color of Carrots," HortScience, vol. 34(6), pp. 1095-1098 (1999).

Montilla et al., "Anthocyanin composition of black carrot (*Daucus carota* ssp. *sativus* var. atrorubens Alef.) cultivars Antonina, Beta Sweet, Deep Purple, and Purple Haze," Journal of Agricultural and Food Chemistry, vol. 59(7), pp. 3385-3390 (2011).

Reid et al., "New Aspects of the Practical Use of Ethylene-Releasing Compounds," Plant Growth Substances, pp. 595-603 (1988).

* cited by examiner

Figure 1 - Table 1. Total monomeric anthocyanin content (TMC) and yield parameters for roots of 2-Chloroethylphosphonic acid (active ingredient, a.i.)-treated carrot plants. TMC is expressed as relative fold changes of 2-Chloroethylphosphonic acid -treated carrots compared with untreated carrots, at 21 weeks after planting.

| a.i. (g ha$^{-1}$) | TMC (µg g$^{-1}$ FW) | Weight / root (g) ± SE | SSC (°Bx) ± SE | DW (%) |
|---|---|---|---|---|
| *Harvest 1* | | | | |
| 0 | 1b | 82.04 ± 3.75 | 14.01 ± 0.88 | 10.21a |
| 120 | 1.65a | 81.16 ± 6.19 | 13.03 ± 0.41 | 9.78a |
| 360 | 1.50a | 82.45 ± 4.57 | 12.95 ± 0.37 | 9.43a |
| *Harvest 2* | | | | |
| 0 | 1b | 89.06 ± 5.21 | 13.33 ± 0.08 | 9.86a |
| 360 | 1.38a | 91.37 ± 3.90 | 12.33 ± 0.58 | 9.01a |
| 720 | 1.37a | 88.33 ± 2.14 | 12.48 ± 0.30 | 9.22a |
| *Harvest 3* | | | | |
| 0 | 1b | 86.14 ± 2.13 | 13.81 ± 0.25 | 10.02a |
| 360 | 1.69a | 87.22 ± 4.16 | 12.46 ± 0.11 | 9.67a |
| 720 | 1.61a | 84.15 ± 1.75 | 12.41 ± 0.39 | 9.39a |

SSC: soluble solid content; FW: fresh weight; DW: dry weight; SE: standard error. Means followed by the same letter are not different according to Tukey's test ($p \leq 0.05$).

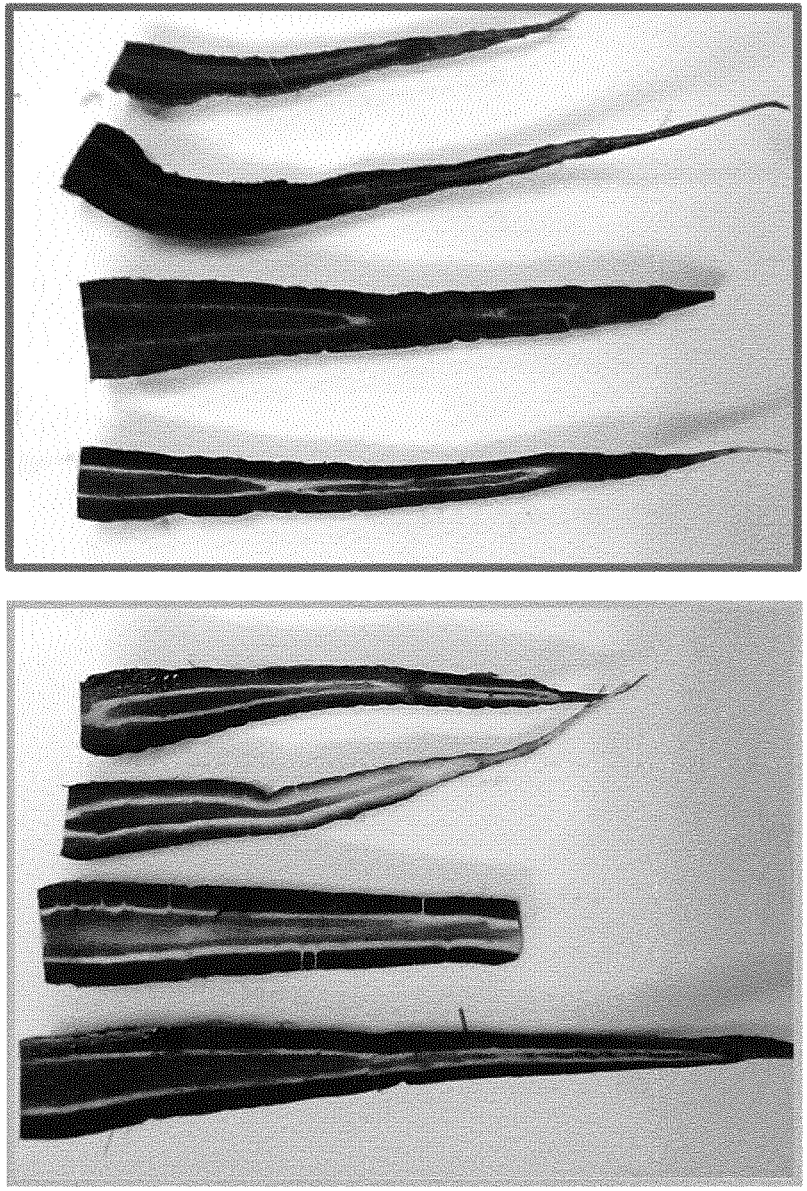
Figure 2. Longitudinal sections of untreated and 360 g ha$^{-1}$ 2-Chloroethylphosphonic acid-treated carrots 21-weeks after planting.

METHOD FOR INCREASING ANTHOCYANIN CONTENT IN CARROTS

CROSS-REFERENCE TO RELATED APPLICATIONS

The present application is the U.S. National Stage of International Application PCT/EP2017/074096, filed Sep. 22, 2017, and claims priority to European Patent Application No. 16190288.7, filed Sep. 23, 2016.

FIELD OF THE INVENTION

The present invention relates to a method for obtaining an anthocyanin pigment color composition from carrot plants comprising pre-harvest foliar spraying of an ethylene-releasing compound and the use of the obtained anthocyanin pigment color composition for coloring of an edible product or a pharmaceutical product.

BACKGROUND ART

There is increasing demand for natural food colourants that can substitute synthetic colours due to both aggravated legal restrictions and consumer concerns. Black carrots (*Daucus carota* ssp. *sativus* var. atrorubens Alef.) are a source of the natural colourant anthocyanin (Montilla et al. 2011). Anthocyanins are wide-spread water-soluble pigments belonging to the flavonoid group of phenolic compounds. They provide bright purple-bluish to red colours and possess high pH, light, and heat stability, representing excellent replacement for artificial red-purple food colours.

Black carrot originated from Middle Asia and was traditionally grown in oriental countries. In recent years, many new varieties and old landraces with high pigment contents are being cultivated. Nowadays, extracts of black carrots are widely utilized in juices, confectionery, candies, ice cream and soft drinks.

Anthocyanins are well known as a group of compounds giving color to food, vegetables and flowers and are responsible for the blue, purple, violet, magenta, red and orange color of many plant species. Anthocyanins are non-toxic pigments and therefore anthocyanins extracted from fruit and vegetables have been used as food colorants for providing colors in the orange to purple color range.

Anthocyanins are regarded as both secondary metabolites and as antioxidants. The accumulation of secondary metabolites often requires elicitors, which usually act as signalling molecules of plant stress responses.

Compounds that release ethylene when sprayed on plants have become of major economic importance, being used to accelerate diverse ethylene responses such as induction of flowering, stimulation of latex flow, leaf and branchlet abscission, fruit ripening, fruit abscission, and pod dehiscence.

A number of such ethylene-releasing compounds are known in the art—suitable examples are e.g. Ethephon, Silaid, Alsol, ACC (M. S. Reid, 1988; Yoseph Levy et al. 1979).

Ethephon has been used to improving carotene contents in orange carrots (Bewick et al. 1987; Milton et al. 1999) and to accelerate the advancement of maturity and anthocyanin contents during apple ripening (Gómez-Cordobés et al. 1996).

SUMMARY OF THE INVENTION

The problem to be solved by the present invention is to provide a novel method for obtaining an anthocyanin pigment color composition from carrot plants (preferably black carrot plants), wherein the method improves the yield/amount of obtained anthocyanin pigment.

The solution is based on that the present inventors identified that by pre-harvest foliar spraying of an ethylene-releasing compound on black carrot leaves the mean anthocyanin concentration in the roots of the treated plants increased by more than 35% when compared with their respective controls—in working Example 1 herein is shown that in three repetitions of two growing seasons, the mean anthocyanin concentration of ethylene-releasing compound treated plants increased by 49, 38 and 65% when compared with their respective controls.

See also FIG. 2 herein—where one visually clearly can see the increased amounts of anthocyanin in the ethylene-releasing compound treated black carrot roots as compared to untreated roots.

It is evident that pre-harvest use of ethylene-releasing compound implies extra work/costs in relation to production of an anthocyanin pigment color product from black carrot—i.e. the skilled person would not use ethylene-releasing compound if the skilled person would not obtain a significant improvement of the yield/amount of obtained anthocyanin pigment.

Black carrot is a herein preferred carrot—but it is believed that the present invention would be relevant for any carrot plant that is capable of producing anthocyanin pigments.

Accordingly, a first aspect of the invention relates to a method for obtaining an anthocyanin pigment color composition from carrot plants comprising the following steps:
(i): foliar spraying of an ethylene-releasing compound on the leaves of carrot plants;
(ii): harvesting the carrot plants of step (i); and
(iii): isolating anthocyanins from the harvested carrot plants of step (ii) and thereby obtaining the anthocyanin pigment color composition.

A second aspect of the invention relates to the use of an anthocyanin pigment color composition obtained according to the method of the first aspect and/or an embodiment thereof for coloring of an edible product or a pharmaceutical product.

Embodiment of the present invention is described below, by way of examples only.

DRAWINGS

FIG. 1: Table with data showing that field-applied ethylene-releasing compound induced the accumulation of anthocyanin measured twenty-one weeks after sowing—see working Example 1 for further details.

FIG. 2: Photos showing that ethylene-releasing compound treated roots displayed a solid purple colour, whereas untreated roots showed a white core, visible both in cross and longitudinal sections—see working Example 1 for further details.

FIG. 3: Total monomeric anthocyanin content (TMC) (A), dry weight (DW) (B), and soluble solid content (SSC) (C) were monitored in Deep Purple roots from 30 Jun. 2015 to 19 Jan. 2016 (seven to 35 weeks after sowing). Vertical bars represent the average standard error. Different letters indicate statistical significance according to Tukey's test ($p \leq 0.05$). See working Example 1 for further details.

Figure 4:
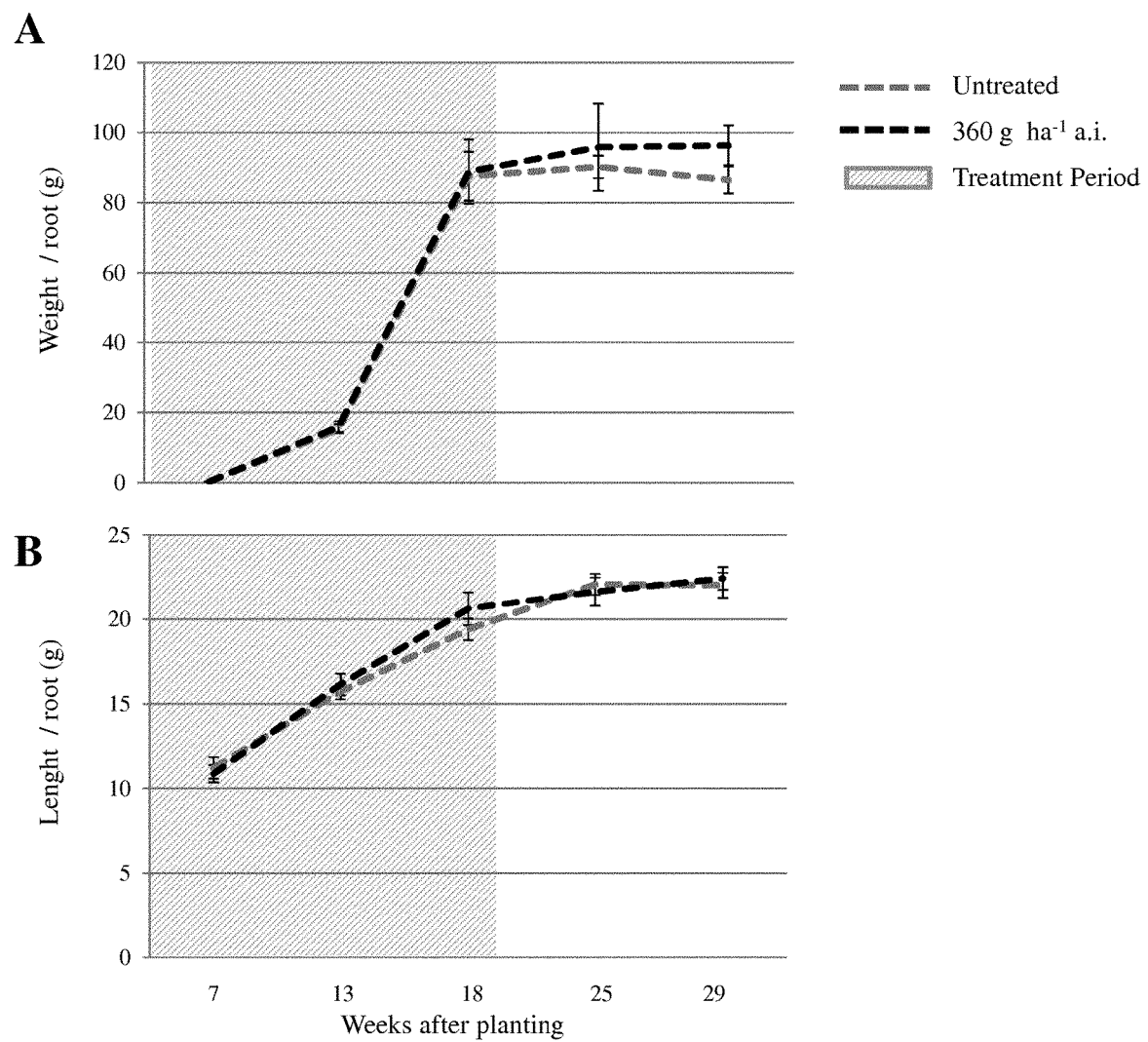

FIG. 4: Monitoring of root weight (A) and length (B) of Deep Purple from 30 Jun. 2015 to 19 Jan. 2016 (seven to 35 weeks after sowing). Vertical bars represent the average standard error. Different letters indicate statistical significance according to Tukey's test ($p \leq 0.05$). See working Example 1 for further details.

DETAILED DESCRIPTION OF THE INVENTION

As evident to the skilled person—a combination of two herein discussed preferred embodiments is understood to be an even more preferred embodiment.

A Method for Obtaining an Anthocyanin Pigment Color Composition from Carrot:

As discussed above, a first aspect of the invention relates to a method for obtaining an anthocyanin pigment color composition from carrot plants comprising the following steps:
 (i): foliar spraying of an ethylene-releasing compound on the leaves of carrot plants;
 (ii): harvesting the carrot plants of step (i); and
 (iii): isolating anthocyanins from the harvested carrot plants of step (ii) and thereby obtain the anthocyanin pigment color composition.

It is evident that the carrot plants are herein carrot plants that are capable of producing anthocyanin pigments.

Preferably, the carrot plants are black carrot plants.

The term "black carrot" is well known to the skilled person and the skilled person knows if a carrot of interest is a black carrot or another type of carrot (e.g. an orange carrot). According to the art, the Latin name for black carrot is *Daucus carota* ssp. *sativus* var. atrorubens Alef.

As known in the art—the term "foliar spraying" relates to a technique of feeding plants by applying liquid active ingredient (here ethylene-releasing compound) directly to their leaves. This is a well know technique that skilled person routinely knows how to perform.

As discussed above, compounds that release ethylene when sprayed on plants have become of major economic importance, being used to accelerate diverse ethylene responses such as induction of flowering, stimulation of latex flow, leaf and branchlet abscission, fruit ripening, fruit abscission, and pod dehiscence.

A number of such ethylene-releasing compounds are known in the art—suitable examples are e.g. Ethephon, Silaid, Alsol, ACC (M. S. Reid, 1988; Yoseph Levy et al. 1979).

In agreement with the prior art—the term "ethylene-releasing compound" relates herein to a compound that release ethylene when sprayed on plants. The ethylene releasing compound is also denoted the "active ingredient".

The chemical names for Ethephon, Silaid, Alsol, ACC (M. S. Reid, 1988) are:
Ethephon: 2-Chloroethylphosphonic acid;
Silaid: (2-chloroethyl)methylbis(phenylmethoxy)silane;
Alsol: (2-chloroethyl)tris(2-methoxyethoxy)silane;
ACC: 1-aminocyclopropane-1-carboxylic acid It may be preferred that the ethylene-releasing compound is 2-Chloroethylphosphonic acid; (2-chloroethyl)methylbis(phenylmethoxy)silane; (2-chloroethyl)tris(2-methoxyethoxy)silane or 1-aminocyclopropane-1-carboxylic acid.

It may be relevant that two or more different ethylene-releasing compounds are used in the method of the first aspect—e.g. as mixture of Ethephon and Alsol.

Preferably, the ethylene-releasing compound is 2-Chloroethylphosphonic acid.

As discussed above, Ethephon is a commercial product comprising the compound with IUPAC name: 2-Chloroethylphosphonic acid. Other names include e.g. Bromeflor, Arvest or Ethrel.

Ethephon is used in working Example herein and it may be seen as an example of a preferred 2-Chloroethylphosphonic acid composition.

As known in the art—the term "harvesting" relates to the process of gathering a ripe crop from the fields.

The method of the first aspect may preferably be used for commercial relevant large scale production of anthocyanin pigment—i.e. large scale isolation from carrot plants. Accordingly, it may be preferred that the isolating of anthocyanins of step (iii) is done from at least 15 different harvested carrot plants, more preferably from at least 100 different harvested carrot plants, even more preferably from at least 500 different harvested carrot plants, such as from at least 1000 different harvested carrot plants.

It is evident that when e.g. at least 15 different harvested carrot plants are used in isolation step (iii), then has foliar spraying of ethylene-releasing compound (e.g. 2-Chloroethylphosphonic acid) of step (i) been done on at least 15 different carrot plants and in step (ii) have at least 15 different harvested carrot plants been harvested.

As discussed above, the present inventors identified that by pre-harvest foliar spraying of 2-Chloroethylphosphonic acid (e.g. Ethephon) on carrot leaves the mean anthocyanin concentration of treated plants increased by more than 35% when compared with their respective controls—in working Example 1 herein is shown that in three repetitions of two growing seasons, the mean anthocyanin concentration of treated plants increased by 49, 38 and 65% when compared with their respective controls.

Based on the technical information herein—the skilled person may routinely optimize the method (e.g. the amount of e.g. 2-Chloroethylphosphonic acid used in step (i) etc.) to get a maximum improvement of the yield/amount of obtained anthocyanin pigment.

Preferably, the amount of obtained anthocyanin pigment in step (iii) of the method of the first aspect is an amount of anthocyanin pigment which is at least 15% higher (w/w) (more preferably at least 20% higher (w/w), even more preferably at least 25% higher (w/w) and most preferably at least 35% higher (w/w)) as compared to the amount of anthocyanin pigment that is obtained in a control experiment without use of ethylene-releasing compound in step (i).

As understood by the skilled person in the present context—the purpose of a control experiment is to analyze the effect of using ethylene-releasing compound (e.g. 2-Chloroethylphosphonic acid). Accordingly, everything in the control experiment (e.g. harvesting time in step (ii), specific method of isolation in step (iii), etc.) shall be identical to the method using ethylene-releasing compound (e.g. 2-Chloroethylphosphonic acid) of the first aspect.

As discussed in working Example herein, no differences were found among 120, 360 and 720 g ha$^{-1}$ a.i. 2-Chloroethylphosphonic acid treatments (a.i. denotes active ingredient).

Without being limited to theory, it is believed that even addition of only 5 g ha$^{-1}$ a.i. of 2-Chloroethylphosphonic acid would have a positive effect on the yield/amount of obtained anthocyanin (maybe not a maximum effect, but still a positive effect)—further more than e.g. 720 g ha$^{-1}$ a.i. of 2-Chloroethylphosphonic acid may be added if wanted.

Accordingly and in relation to step (i)—it may be preferred that the amount of ethylene-releasing compound applied by spraying in step (i) is an amount of from 5 g ha$^{-1}$ active ingredient (a.i.) to 5000 g ha$^{-1}$ a.i.

Preferably, the amount of ethylene-releasing compound (preferably 2-Chloroethylphosphonic acid) applied in step (i) is an amount of from 25 g ha$^{-1}$ a.i. to 1000 g ha$^{-1}$ a.i., more preferably it is an amount of from 35 g ha$^{-1}$ a.i. to 500 g ha$^{-1}$ a.i., such as e.g. an amount of from 50 g ha$^{-1}$ a.i. to 200 g ha$^{-1}$ a.i.

In the working Example herein 2-Chloroethylphosphonic acid application was started 6 weeks after planting/sowing and continued every 3 weeks, for a total of e.g. 6 applications.

It is evident that an ethylene-releasing compound (e.g. 2-Chloroethylphosphonic acid) should not be applied by foliar spraying to the leaves before the leaves of black carrot plants have a relevant size.

Accordingly and in relation to step (i)—it may be preferred that the foliar spraying of an ethylene-releasing compound of step (i) is done later than 1 week after planting, preferably it is done later than 2 weeks after planting. It may be preferred that it is done later than 4 weeks after planting.

It may be preferred that the foliar spraying of ethylene-releasing compound of step (i) is done more than one time (such as e.g. 2 times) before the harvesting the carrot plants of step (ii). It may be preferred that it is done at least 3 times before the harvesting the carrot plants of step (ii), such as at least 5 times.

Step (ii) of the first aspect relates to harvesting the carrot plants of step (i). As discussed above, the skilled person routinely knows how to perform such harvesting step (ii)—i.e. it may be done according to the art.

In working Example herein, harvesting the black carrot plants were done 7, 10, 13, 16, 19, 22, 25, 26, 29 and 35 weeks after planting and 2-Chloroethylphosphonic acid treated roots showed a higher mean anthocyanin concentration at every harvest point.

In relation to step (ii), it may be preferred that harvesting of the carrot plants of step (ii) of the first aspect is done later than 4 weeks after planting, preferably it is done later than 6 weeks after planting, such as e.g. it is done later than 10 weeks after planting.

Step (iii) of the first aspect relates to isolating anthocyanins from the harvested carrot plants of step (ii) and thereby obtain the anthocyanin pigment color composition.

The term "isolating" in step (iii) should be understood as that some liquid (e.g. water) and/or solids are separated from the anthocyanins—i.e. the anthocyanin pigment color composition does not comprise all liquid (e.g. water) and/or solids of the carrots.

For instance, the in step (iii) obtained anthocyanin pigment color composition may be a juice.

The skilled person routinely knows how to perform isolating step (iii)—i.e. it may be done according to the art, such as by extraction from the taproots of the harvested carrot plants (preferably black carrot plants).

It may be preferred (as done in working Example herein) that the isolating of the anthocyanins of step (iii) is done by extraction of the anthocyanin pigments from the taproots of the harvested carrot plants (preferably black carrot plants).

The in step (iii) obtained anthocyanin pigment color composition may have a wanted purity and it may be in e.g. liquid or dried form—Purification may be performed e.g. by use of High Performance Liquid Chromatography (HPLC) to obtain a desired degree of purity.

It may be preferred that the in step (iii) obtained anthocyanin pigment color composition is a composition comprising at least 20% (w/w—dry matter) of the isolated anthocyanin pigments—such as e.g. a composition comprising at least 50% (w/w—dry matter) of the isolated anthocyanin pigments or a composition comprising at least 90% (w/w—dry matter) of the isolated anthocyanin pigments.

It may be preferred that the in step (iii) obtained anthocyanin pigment color composition is a liquid composition or a dried composition that comprises less than 25% (w/w) of liquid (e.g. water).

Use of the Anthocyanin Pigment Color Composition for Coloring of a Product:

As discussed above, a second aspect of the invention relates to use of an anthocyanin pigment color composition obtained according to the method of the first aspect and/or an embodiment thereof for coloring of an edible product or a pharmaceutical product.

Anthocyanins have been used as colorants for many products (e.g. food products) and the coloring use of the anthocyanin pigment color composition of the second aspect may be performed according to the art.

An edible product may e.g. be a food product or a feed product.

Examples of a food product are dairy product, juice, beverage, wine gum, marmalade, jam, sugar confectionery, panned chocolate lentils, sausage casings, pasta, macaroni, cheese, prepared food or extruded foods.

The embodiments described herein can be further understood by reference to the following non-limiting examples.

EXAMPLES

Example 1—Field-Applied Ethylene-Releasing Compound Enhanced the Accumulation of Anthocyanins During Black Carrot Growth 1. Materials and methods.
1.1. Plant Material, Field Trial Conditions and Elicitor Treatment.

The experiment consisted on a factorial combination of 3 carrot cultivars (Deep Purple F1) and three sowing dates: 19 May 2014, and 18 and 25 May 2015, in field trials in Taastrup, Denmark, at the experimental station in Højbakkegård (latitude 55, longitude 40.1-40.3). Seeds were provided by Chr. Hansen A/S. Plants were cultivated on loamy soil. Air temperatures during the growing period were slightly different in both years of cultivation (mean values of 2 years: 15.4 and 14.6° C., May-October). Rainfall was complemented by irrigation throughout carrot growth to avoid water stress. The routine techniques of cultivation and plant protection, recommended for carrot crop production were applied.

Plots were arranged in a randomized block design with three replications. In the three sowing dates, each plot consisted of three 4.5 m-long rows. Additionally, plots of three 12 m-long rows were arranged in 18 May 2015. 2-Chloroethylphosphonic acid solution (CERONE® brand ETHEPHON, 39.9% Bayer CropScience, Leverkusen, Germany) was applied as a foliar spray avoiding the rainy days, at rates of 0, 120 and 360 g·ha$^{-1}$ a.i. in 2014; 0, 360, and 720 g·ha$^{-1}$ a.i. in 2015 for small plots; and 0 and 360 g·ha$^{-1}$ a.i. for large plots. Applications were made using a $CO_2$ backpack spaced 50 cm apart, beginning 6 weeks after planting and continuing every 3 weeks, for a total of 6 applications.
1.2. Harvest and Sample Preparation.

Small plots (4.5 m-long rows) were harvested 21 weeks after sowing. The roots were manually harvested from the middle part of each row.

Large plots (12 m-long rows) were harvested several times from separate row segments, during the growing period from 30 Jun. 2015 to 19 Jan. 2016 (7, 10, 13, 16, 19, 22, 25, 26, 29 and 35 weeks after planting). Carrot production was estimated in large plots 21 weeks after planting:

two meters per row was dug from each plot, and the carrots were washed and weighed. Measured weights were extrapolated to tons per hectare.

In all analyses, 20 whole carrot roots per plot were washed and split lengthwise: 20 halves were ground in liquid nitrogen, and the generated powder was stored at −80° C. for further gene expression analyses; the complementary 20 halves were coarsely ground in a commercial blender, and 50 g of the resulting purée were immediately homogenized in 50 g of a 3% sulfuric acid solution (v/v), by using a Waring two-speed commercial blender (VWR—Bie & Berntsen, Herlev, Denmark). The resulting fine purée (4 g) was subsequently mixed with demineralized water (8 g) and vortexed. After incubation for 1 h at room temperature, the sample was centrifuged 20 min at 4500 rpm, and the supernatant (extract) was utilized for further analyses.

1.3. Determination of Dry Matter and Soluble Solid Content (° Brix).

Soluble solids were calculated with a digital refractometer with automatic temperature compensation and operating range from 0 to 53° Brix. For its calculation, the carrot extract obtained was filtered through 0.45 μm membrane filters, and Brix measurements were performed using 1 mL of the filtrate. For each measurement, two technical replicates were made and their average was reported.

Dry matter was determined by the mass difference between the fresh sample and the dry sample. The sample was dried 24 h until it reached a constant weight using an oven at 90° C. The results were expressed as percentage of dry matter. For each measurement, two technical replicates were made and their average was reported.

1.4. Determination of Total Monomeric Anthocyanin Content (TMC).

TMC was measured spectrophotometrically based on the pH differential method, with slight modifications. The carrot extract was diluted by adding 20 volumes of 0.2 M KCl-HCl pH 1, and TMC was measured at 350 and 700 nm (to correct for sediment) using a UV-Vis spectrophotometer (Evolution™ 220, Thermo Fischer Scientific, Waltham, MA, USA). The TMC was expressed as cyaniding-3-glucoside equivalents (ppm).

1.5. Statistical Analyses.

All analyses were performed with three technical and three biological replicates. Data were subjected to statistical analysis using SPSS software (version 22, SPSS Inc., Chicago, IL, USA). Treatments were compared using one-way analysis of variance (ANOVA) followed by a Tukey post hoc test. $p<0.05$ was considered significant.

Results

Total Anthocyanins Content and Yield Data of Ethylene-Releasing Compound-Treated Carrots Field-applied 2-Chloroethylphosphonic acid induced the accumulation of anthocyanin measured twenty-one weeks after sowing (FIG. 1). Treated roots displayed a solid purple colour, whereas untreated roots showed a white core, visible both in cross and longitudinal sections (FIG. 2). From the three repetitions of the two growing seasons (Harvest 1-3), the mean anthocyanin concentration of treated plants increased by 49, 38 and 65% when compared with their respective controls. In this sense, the total amount of 2-Chloroethylphosphonic acid applied had a nonsignificant effect on the accumulation of anthocyanin, i.e. no differences were found among 120, 360 and 720 g $ha^{-1}$-treatments in either growing season (FIG. 1). The 2-Chloroethylphosphonic acid-treated plants also showed the lowest values of dry weight (DW) and soluble sugar content (SSC). In contrast, 2-Chloroethylphosphonic acid applications did not affect root weight in either growing season (FIG. 1). Differences in anthocyanin concentration and yield data among growing seasons are likely due to fluctuations in environmental factors such as temperature, light intensity and temperature.

In addition, large plots were arranged in 2015 growing season for successive harvests during the period from 30 Jun. 2015 to 19 Jan. 2016 (7, 10, 13, 16, 19, 22, 25, 26, 29 and 35 weeks after planting). TMC and yield data were determined at each harvest time (FIGS. 3 and 4). Treated roots showed a higher mean anthocyanin concentration at every harvest point. Interestingly, TMC continued to increase 7 weeks after the application of the last 2-Chloroethylphosphonic acid treatment (22 to 27 weeks after planting) (FIG. 3A). An unexpected evolution of the DM content was observed for both untreated and treated roots during the growing season, by forming a marked peak at 13 weeks after planting (FIG. 3B). The same trend is observed for the SCC contents (FIG. 3C). Moreover, the highest rate of anthocyanin accumulation was reached from 10 to 13 weeks after planting, concurring with the highest DW and SSC values (FIG. 3). Root weight and length differed insignificantly when untreated and treated carrots were compared at each harvest time (FIG. 4). From 13 to 19 weeks after planting, root growth was predominantly secondary, as induced from the fourfold increase in weight and the minor increase in length.

REFERENCES

1. Montilla E C, Arzaba M R, et al. (2011) Anthocyanin composition of black carrot (Daucus carota ssp. sativus var. atrorubens Alef.) cultivars Antonina, Beta Sweet, Deep Purple, and Purple Haze. J Agric Food Chem. 59(7):3385-3390.
2. Bewick, T. A. Binning, L. K. Simon, P. W. (1987) Effect of ethephon on the carotene content of early planted carrots. Acta Horticulturae: Manipulation of Ethylene Responses, Issue: 201. Publisher: ISHS.
3. Milton E. McGiffen Jr., Edmund J. Ogbuchiekwe (1999) Ethephon Increases Carotene Content and Intensifies Root Color of Carrots. HortScience October 34(6): 1095-1098.
4. Carmen Gómez-Cordovés, Francisco Varela, Christian Larrigaudiere, and Miguel Vendrell; Effect of Ethephon and Seniphos Treatments on the Anthocyanin Composition of Starking Apples, Instituto de Fermentaciones Industriales, CSIC, Juan de la Cierva 3, 28006 Madrid, Spain, and Centro de Investigación y Desarrollo, CSIC, Jordi Girona 18-26, 08034 Barcelona, Spain J. Agric. Food Chem., 1996, 44 (11), pp 3449-3452.
5. M. S. Reid; New Aspects of the Practical Use of Ethylene-Releasing Compounds, Chapter, Plant Growth Substances 1988, pp 595-603
6. Yoseph Levy, J. Greenberg, S. Ben-Anat; Effect of ethylene-releasing compounds on oleocellosis in 'Washington' navel oranges; Scientia Horticulturae, Volume 11, Issue 1, August 1979, Pages 61-68

The invention claimed is:
1. A method for obtaining an anthocyanin pigment color composition from carrot plants, comprising:
 (i) foliar spraying an ethylene-releasing compound on carrot plant leaves
 (ii) subsequently, harvesting the carrot plants; and
 (iii) isolating anthocyanin pigments from the harvested carrot plants, thereby obtaining the anthocyanin pigment color composition wherein the ethylene-releasing compound used in step (i) is either one or a mixture of two selected from 2-chloroethylphosphonic acid, (2-chloroethyl) methylbis (phenylmethoxy) silane; (2-chloroethyl) tris (2-methoxyethoxy) silane, and laminocyclopropane-1-carboxylic acid.

2. The method of claim 1, wherein the carrot plants are capable of producing anthocyanin pigments.

3. The method of claim 1, wherein the isolation of anthocyanin pigments of step (iii) is carried out using at least 100 different harvested carrot plants, wherein the harvested carrot plants are pre-treated by foliar spraying of ethylene-releasing compound in step (i).

4. The method of claim 1, wherein the amount of obtained anthocyanin pigments is at least 15% (w/w) higher than the amount of anthocyanin pigments obtained in a control experiment wherein the control experiment is in identical environmental conditions as the ethylene-releasing compound treated carrot plants except the application of ethylene-releasing compound in step (i).

5. The method of claim 1, wherein the amount of ethylene-releasing compound applied by foliar spraying in step (i) is from 5 g ha$^{-1}$ active ingredient (a.i.) to 5000 g ha$^{-1}$ a.i.

6. The method of claim 1, wherein the amount of Ethylene-releasing compound applied by foliar spraying in step (i) is from 50 g ha$^{-1}$ a.i. to 200 g ha$^{-1}$ a.i.

7. The method of claim 1, wherein the foliar spraying of step (1) is performed later than 2 weeks after planting of the carrot plants.

8. The method of claim 1, wherein the foliar spraying of step (i) is performed at least 3 times before the harvesting of step (ii) and the harvesting of step (ii) is performed later than 6 weeks after planting of the carrot plants.

9. The method of claim 1, wherein the isolating of step (iii) comprises extracting anthocyanin pigments from taproots of the harvested carrot plants.

10. The method of claim 1, wherein the anthocyanin pigment color composition obtained at step (iii) comprises one of the following:
at least 20% (w/w dry matter) or
50% (w/w dry matter) or
90% (w/w dry matter) of the isolated anthocyanin pigments.

11. The method of claim 1, wherein the ethylene-releasing compound used in step (i) is one of 2-chloroethylphosphonic acid, (2-chloroethyl) methylbis (phenylmethoxy) silane; (2-chloroethyl) tris (2-methoxyethoxy) silane, and laminocyclopropane-1-carboxylic acid.

12. The method of claim 1, wherein the ethylene-releasing compound used in step (i) is a mixture of two selected from 2-chloroethylphosphonic acid, (2-chloroethyl) methylbis (phenylmethoxy) silane; (2-chloroethyl) tris (2-methoxyethoxy) silane, and 1-aminocyclopropane-1-carboxylic acid.

* * * * *